United States Patent
Akagi et al.

(10) Patent No.: US 8,927,162 B2
(45) Date of Patent: *Jan. 6, 2015

(54) SOLID OXIDE FUEL CELL SYSTEM PERFORMING DIFFERENT RESTART OPERATIONS DEPENDING ON OPERATION TEMPERATURE

(75) Inventors: Yousuke Akagi, Kitakyushu (JP); Naoki Watanabe, Kitakyushu (JP); Shuichiro Saigan, Kitakyushu (JP); Nobuo Isaka, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 688 days.

This patent is subject to a terminal disclaimer.

(21) Appl. No.: 13/262,014
(22) PCT Filed: Mar. 31, 2010
(86) PCT No.: PCT/JP2010/055906
§ 371 (c)(1),
(2), (4) Date: Sep. 29, 2011
(87) PCT Pub. No.: WO2010/114039
PCT Pub. Date: Oct. 7, 2010

(65) Prior Publication Data
US 2012/0028143 A1 Feb. 2, 2012

(30) Foreign Application Priority Data
Mar. 31, 2009 (JP) ................................ 2009-087413

(51) Int. Cl.
*H01M 8/06* (2006.01)
*H01M 8/04* (2006.01)
*C01B 3/38* (2006.01)
*H01M 8/24* (2006.01)
*H01M 8/12* (2006.01)

(52) U.S. Cl.
CPC ........... *H01M 8/04373* (2013.01); *C01B 3/382* (2013.01); *C01B 3/384* (2013.01); *H01M 8/04223* (2013.01); *H01M 8/0618* (2013.01); *C01B 2203/0233* (2013.01);
(Continued)

(58) Field of Classification Search
CPC ............ H01M 8/0618; H01M 8/04373; C01B 2203/025–2203/0261
USPC .................................................. 429/429, 423
See application file for complete search history.

(56) References Cited

U.S. PATENT DOCUMENTS

2009/0291335 A1  11/2009  Anzai
2011/0053017 A1*  3/2011  Takahashi ...................... 429/423

FOREIGN PATENT DOCUMENTS

EP         1840997 A1    10/2007
JP       2003-095611 A    4/2003
(Continued)

OTHER PUBLICATIONS

Extended European Search Report for European Application No. 10758810.5, dated Dec. 18, 2012, 5 pages.
(Continued)

*Primary Examiner* — Maria J Laios
*Assistant Examiner* — Robert S Carrico
(74) *Attorney, Agent, or Firm* — Brinks Gilson & Lione

(57) ABSTRACT

The present invention comprises fuel cells 84 disposed within a fuel cell module 2, a reformer 20, a reformer temperature sensor 148 for detecting a reforming state temperature, and a control section 110 for controlling the operation of the fuel cell module. The control section prohibits the normal startup POX and executes a restart control different from the normal startup POX when the reforming state temperature is at least in a high temperature region within the POX temperature band in a state in which the operation of the solid oxide fuel cell module is stopped.

8 Claims, 11 Drawing Sheets

(52) U.S. Cl.
CPC .............. *C01B 2203/0244* (2013.01); *C01B 2203/0261* (2013.01); *C01B 2203/066* (2013.01); *C01B 2203/0811* (2013.01); *C01B 2203/1058* (2013.01); *C01B 2203/1064* (2013.01); *C01B 2203/1258* (2013.01); *C01B 2203/1604* (2013.01); *C01B 2203/1609* (2013.01); *C01B 2203/1619* (2013.01); *C01B 2203/1685* (2013.01); *H01M 8/04014* (2013.01); *H01M 8/04089* (2013.01); *H01M 8/243* (2013.01); *H01M 2008/1293* (2013.01); *Y02E 60/50* (2013.01); *Y02E 60/525* (2013.01)
USPC ........... 429/423; 429/427; 429/429; 429/441; 429/466; 429/497; 423/652

(56) References Cited

FOREIGN PATENT DOCUMENTS

| | | |
|---|---|---|
| JP | 2004-319420 A | 11/2004 |
| JP | 2004-338975 A | 12/2004 |
| JP | 2006-086016 A | 3/2006 |
| JP | 2006-190605 A | 7/2006 |
| JP | 2006-269196 A | 10/2006 |
| JP | 2007-311072 A | 11/2007 |
| JP | 2008-243597 A | 10/2008 |
| WO | WO 2007/137068 A1 | 11/2007 |
| WO | WO 2009028427 A1 * | 3/2009 |

OTHER PUBLICATIONS

Written Opinion of the International Searching Authority for International Application No. PCT/JP2010/055906, dated Jul. 20, 2010, 7 pages.
International Preliminary Report on Patentability for International Application No. PCT/JP2010/055906, dated Nov. 15, 2011, 8 pages.
International Search Report for International Application No. PCT/JP2010/055906, dated Jul. 20, 2010, 2 pages.

* cited by examiner

FIG.9

| MODE | STATE | FUEL FLOW (L/min) | REFORMING AIR FLOW (L/min) | GENERATING AIR FLOW (L/min) | WATER FLOW (cc/min) | TRANSITION TEMPERATURE CONDITION (°C) REFORMER TEMP. Tr | STACK TEMP. Ts |
|---|---|---|---|---|---|---|---|
| | ON IGNITION | 6.0 | 10.0 | 100.0 | 0.0 | — | — |
| | COMBUSTION OPERATION | 6.0 | 10.0 | 100.0 | 0.0 | ≧300°C | — |
| NORMAL STARTUP MODE 1 | NORMAL STARTUP POX | 5.0 | 18.0 | 100.0 | 0.0 | ≧600°C | ≧250°C |
| | NORMAL STARTUP ATR | 4.0 | 4.0 | 100.0 | 3.0 | ≧650°C | ≧600°C |
| | NORMAL STARTUP SR | 3.0 | 0.0 | 100.0 | 8.0 | ≧650°C | ≧700°C |
| | ON IGNITION | 6.0 | 10.0 | 100.0 | 0.0 | IGNITE IF ≧200°C. TRANSITION TO RESTART POX IMMEDIATELY AFTER IGNITION | — |
| | RESTART POX | 5.5 | 17.0 | 100.0 | 0.0 | ≧230°C | — |
| RESTART MODE | IGNITION PROHIBITED | IGNITION IS PROHIBITED AND STOP IS CONTINUED IN THE RANGE OF 230°C≦REFORMER TEMP.<500°C. WHEN TEMP. DROPS BELOW 230°C, TRANSITIONS TO RESTART POX AFTER IGNITION. | | | | | |
| | NORMAL STARTUP ATR | 4.0 | 4.0 | 100.0 | 3.0 | ≧600°C | ≧600°C |
| | NORMAL STARTUP SR | 3.0 | 0.0 | 100.0 | 8.0 | ≧650°C | 700°C |

SOLID OXIDE FUEL CELL SYSTEM PERFORMING DIFFERENT RESTART OPERATIONS DEPENDING ON OPERATION TEMPERATURE

TECHNICAL FIELD

The present invention relates to a solid oxide fuel cell device, and more particularly to a solid oxide fuel cell device for generating electricity by reacting fuel gas with air.

BACKGROUND ART

Solid oxide fuel cell device ("SOFC" below) operate at relatively high temperatures, using an ion oxide electrically conductive solid electrolyte as electrolyte, with electrodes placed on both sides thereof, and with fuel gas supplied to one side thereof and an oxidizer (air, oxygen, or the like) supplied to the other side thereof.

In such SOFC, steam or $CO_2$ is produced by the reaction between oxygen ions passed through the ion oxide electrically conductive solid electrolyte and fuel, thereby generating electrical and thermal energy. Electrical energy is extracted from the SOFC, where it is used for various electrical purposes. Thermal energy is transferred to the fuel, the reformer, the oxidizer, and the like, and is used to raise the temperature of those constituents.

In the conventional SOFC, operation must be temporarily halted when a microprocessor-based meter in a fuel gas supply system detects an anomaly during operation, or when anomalies due to earthquakes or the like arise, or when maintenance of auxiliary devices and the like are performed. After such anomalies or other temporary factors have been resolved, or after maintenance is completed, prompt resumption of operation in as little time as possible is sought to ensure stable electrical generation.

In order to bring about prompt resumption of operation in fuel cell systems it has been proposed, for example in Patent Document 1, that for conventional SOFC when there is a request to restart the fuel cell system during a predetermined control process, the control system, rather than executing the first startup processing routine after executing all of the fuel cell system stop processing routines, should first transition to the point in time at which conditions are the same as for the point in time at which the call for restart was made, and then execute the restart process.

At the same time, in the conventional SOFC set forth in Patent Document 2, it is proposed that thermal efficiency can be raised by housing the fuel cell stack in a housing container, while heating can be accomplished by heating with higher than conventional temperature fuel gases through combustion of excess gas in the housing container, thereby obtaining thermal quantities required for steam reforming when in a low load operation. To speed up operation in the conventional SOFC, a heating operation to heat the fuel reformer is performed when the fuel reformer temperature is less than the partial oxidation reaction starting temperature upon startup; when the temperature of the fuel reformer rises to a temperature band greater than the partial oxidation reaction starting temperature and less than the temperature at which steam reforming can occur, the fuel reformer is heated by reaction heat from partial oxidation and combustion heat from the fuel gas, thereby performing a partial oxidation reforming reaction ("POX" below). Furthermore, when the temperature of the fuel reformer rises to a temperature band at which steam reforming can occur, below the steady state temperature, reaction heat of the partial oxidation reaction, combustion heat from the fuel gas, and heat absorption by the steam reforming reaction are controlled to heat the fuel reformer, and an auto-thermal reforming reaction ("ATR" below) is performed in which partial oxidation reforming and steam reforming are used together, such that when the temperature of the fuel reformer reaches a steady state, the fuel reformer is heated by combustion heat from the fuel gas, and a steam reforming reaction ("SR" below) is performed. In other words, in the conventional SOFC of this type, startup was executed by reforming fuel in the sequence of POX, ATR, and SR as the temperature of fuel reformer rose at start up, thereby enabling stable and prompt start up.

PRIOR ART DOCUMENTS

Patent Documents

Patent Document 1: JP-A-2006-269196
Patent Document 2: JP-A-2004-319420

SUMMARY OF THE INVENTION

However, in the SOFC set forth in the above-described Patent Documents 1 and 2, excess heat residing in the fuel cells and stack when not operating has the effect that portions of the fuel cells and stack are frequently in a high temperature state during startup.

In this regard, the present inventors have discovered an important and new problem, which is that when the fuel cells or the stack are in such a high temperature state, particularly when restarting by POX, a heavy burden is placed on the cells.

More specifically, they discovered the serious problem that even though from a control standpoint the reforming temperature may appear suitable for POX operation, when a restart occurs during stop operation control, a portion of the fuel cells or stack may be in a high-temperature state, so that when the POX reaction is carried out on the assumption that the temperature of the fuel reformer is within a temperature band above the partial oxidation starting temperature and below the temperature at which steam reforming can occur, due to the fact that in POX there is an exothermal reaction accompanying partial oxidation upon the introduction of air, there may be an oxidizing effect imparted on the cells, or an extraordinarily high temperature state, leading to gradual degradation of the durability of the cells themselves or the electrical generating capability thereof. The present invention was undertaken to resolve this problem and to greatly reduce the time required for restart.

On the other hand, in the above-described Patent Documents 1 and 2, there is no disclosure or suggestion whatsoever of the concept whereby during restart at a time when temperature is reduced from a high temperature to further speed up restart with protecting cells, the POX is prohibited and a restart control different from the POX used during normal startup is executed even when starting up in the normal startup POX temperature band, and therefore no solution is offered to the new problem described above.

It is therefore an object of the present invention to provide a solid oxide fuel cell device (SOFC) which, with respect to the temperature drop from high temperature when stopped, is capable of reducing the burden on cells and increasing durability by executing a restart control different from and in place of POX during normal startup, and of shortening startup time with preventing the effect on cells by restarting using a restart control for restart purposes.

The above object is achieved according to the present invention by providing a solid oxide fuel cell device for generating electricity by causing an electro-chemical reaction of a fuel gas and an oxidant gas, comprising: solid oxide fuel cells disposed within a solid oxide fuel cell module; a reformer for reforming fuel gas and supplying the fuel gas to the fuel cells by executing any one of the reforming reaction POX, wherein fuel gas is partial oxidation-reformed by causing a chemical reaction between a fuel gas and an oxidizing gas in accordance with a predetermined temperature band, the reforming reaction SR, wherein fuel gas is steam reformed to hydrogen by chemically reacting a fuel gas and steam, and the reforming reaction ATR, wherein fuel gas is auto-thermally reformed by the combined use of POX and SR; a reforming state temperature detector for detecting the reforming state temperature in order to change the reforming state in the reformer; and a controller for controlling the operation of the fuel cell module; wherein the controller is furnished with a startup control device for controlling the startup of the operation of the fuel cell module, and a stop control device for controlling the stopping of the operation of the fuel cell module; wherein the startup control device executes a combustion operation to rise the temperature of the reformer by the combustion heat of the fuel gas when, after the fuel gas is ignited and caused to combust, the reforming state temperature detected by the reforming state temperature detector is lower than the POX starting temperature at which the POX starts; the startup control device executes a normal startup POX to raise the temperature of the reformer when the reforming state temperature is equal to or higher than the POX starting temperature and within a POX temperature band lower than the temperature at which steam reforming is possible; the startup control device executes a normal startup ATR to raise the temperature of the reformer when the reforming state temperature equal to or higher than the temperature at which steam reforming is possible and within the ATR temperature band lower than a predetermined steady state temperature; and the startup control device executes a normal startup SR to raise the temperature of the reformer when the reforming state temperature is equal to or higher than the predetermined steady-state temperature; wherein, when the stop control device executes a stop processing together with stopping of the fuel cell module from a high temperature state, and a restart of operation has been executed within the POX temperature band, the startup control device prohibits the normal startup POX when the reforming state temperature is at least in a high temperature region within the POX temperature band and executes a restart control different from the normal startup POX.

According to the present invention thus constituted, when executing stop processing in which the fuel cell module is stopped from a high temperature state by a stop control device, the execution of POX used in the normal startup is prohibited at least in the high temperature region within the POX temperature band, even if the reforming state temperature is in the POX temperature band at normal startup, and a restart control different from the POX at normal startup is executed. As a result, compared to cases in which POX is carried out unchanged during normal startup, the burden placed on cells due to the oxidation of fuel cells caused by the major residual heat buildup in portions of the fuel cells or reformer even when the apparent temperature is low, or due to unpredictable high temperature states, can be reduced, thereby improving cell durability. Also, by executing a restart control to take active advantage of the residual heat remaining in the fuel cells and reformer, heat recovery from the fuel cell module can be speeded up and startup time reduced without affecting cells.

In the preferred embodiment of the present invention, the startup control device executes a restart control by the ATR when the reforming state temperature is within the ATR temperature band, while the startup control device prohibits the restart by the normal startup POX when the reforming state temperature is within the POX temperature band, the stop control device continues the stopping of operation until the reforming state temperature declines to a predetermined temperature, and the startup control device executes a restart control after the reforming state temperature reaches the predetermined temperature.

According to the present invention thus constituted, restart by POX in normal startup is prohibited in the normal startup POX temperature band when operation is restarted by a startup control device, and restart by POX is executed after waiting for the reforming state temperature to decline to a predetermined temperature, therefore damage to cells caused by executing the POX at high temperatures can be restrained, and restarts can be quickly accomplished.

In the preferred embodiment of the present invention, the startup control device prohibits the restart by the normal startup POX when the reforming state temperature is equal to or higher than a predetermined temperature within the POX temperature band at the time of normal startup, and the stop control device continues the stopping of operation until the reforming state temperature reaches a temperature lower than the predetermined temperature, and the startup control device executes a restart control by the POX after the temperature drops to a temperature lower than the predetermined temperature.

According to the present invention thus constituted, POX-based restart by POX of a normal startup is prohibited in the normal startup POX temperature band when operation is restarted by a startup control device, and restart by POX is executed after waiting for the reforming state temperature to drop to a predetermined temperature, thereby enabling prompt temperature recovery in the fuel cell module using the POX exothermal reaction, and a quick transition to a normal operation.

In the preferred embodiment of the present invention, the startup control device executes a restart control by the ATR when the reforming state temperature is in a first temperature band higher than a first predetermined temperature in the POX temperature band in the normal startup, the startup control device executes a restart control by the POX in a second temperature band lower than the first temperature band within the POX temperature band, the restart control device prohibits a restart in a third temperature band between the first temperature band and the second temperature band, the stop control device continues the stopping of operation until the reforming state temperature falls to a temperature lower than the predetermined temperature, and the startup control device executes a restart control by the POX after the reforming state temperature reaches a temperature lower than the predetermined temperature.

According to the present invention thus constituted, in the POX temperature band in the normal startup, in which residual heat remaining in the fuel cells or the reformer at the time of restart can be actively utilized, the range of ATR operation is expanded up to above the first predetermined temperature range within the POX temperature band in the normal startup so as to execute ATR; restart by POX is employed below a second temperature in which there is no oxidizing effect; and a temperature rise is achieved over a short time period in a stable condition while restraining effects on the cells by prohibiting restart at intermediate temperatures and performing restart by reducing temperature through stop processing control.

In the preferred embodiment of the present invention, the POX executed in the restart control reduces the amount of oxidizing gas supplied compared to the POX in the normal startup.

According to the present invention thus constituted, a faster startup is enabled by actively utilizing residual heat remaining in the solid oxide fuel cells or the reformer, while at the same time the prevention of oxidizing effects on the fuel cells caused by the effects of residual heat due to the introduction of a large amount of oxidizing gas is enabled.

The present invention is a solid oxide fuel cell device for generating electricity by causing an electro-chemical reaction of a fuel gas and an oxidant gas, comprising: solid oxide fuel cells disposed within a solid oxide fuel cell module; means for reforming fuel gas and supplying the fuel gas to the fuel cells by executing any one of the reforming reaction POX, wherein fuel gas is partial oxidation-reformed by causing a chemical reaction between a fuel gas and an oxidizing gas in accordance with a predetermined temperature band, the reforming reaction SR, wherein fuel gas is steam reformed to hydrogen by chemically reacting a fuel gas and steam, and the reforming reaction ATR, wherein fuel gas is auto-thermally reformed by the combined use of POX and SR; means for detecting the reforming state temperature in order to change the reforming state in the reformer; and means for controlling the operation of the fuel cell module; wherein the control means is furnished with means for controlling the startup of the operation of the fuel cell module, and means for controlling the stopping of the operation of the fuel cell module; wherein the startup control means executes a combustion operation to rise the temperature of the reformer by the combustion heat of the fuel gas when, after the fuel gas is ignited and caused to combust, the reforming state temperature detected by the temperature detecting means is lower than the POX starting temperature at which the POX starts; the startup control means executes a normal startup POX to raise the temperature of the reformer when the reforming state temperature is equal to or higher than the POX starting temperature and within a POX temperature band lower than the temperature at which steam reforming is possible; the startup control means executes a normal startup ATR to raise the temperature of the reformer when the reforming state temperature equal to or higher than the temperature at which steam reforming is possible and within the ATR temperature band lower than a predetermined steady state temperature; and the startup control means executes a normal startup SR to raise the temperature of the reformer when the reforming state temperature is equal to or higher than the predetermined steady-state temperature; wherein, when the stop control means executes a stop processing together with stopping of the fuel cell module from a high temperature state, and a restart of operation has been executed within the POX temperature band, the startup control means prohibits the normal startup POX when the reforming state temperature is at least in a high temperature region within the POX temperature band and executes a restart control different from the normal startup POX.

According to the solid oxide fuel cell device (SOFC) of the present invention, executing a restart control different from the POX used in normal startup instead of prohibiting POX in normal startup upon restart when stopping from a high temperature state results in a reduced burden on cells and increased durability, as well as a major shortening of startup time upon startup due to the active utilization of residual heat.

BRIEF DESCRIPTION OF DRAWINGS

FIG. 9 is a data table showing fuel flow amount, reforming airflow amount, generating air flow amount, water flow amount, and reformer and stack transition temperature conditions in each of the states during normal startup and restart operations of a solid oxide fuel cell device (SOFC) according to an embodiment of the present invention;

DETAILED DESCRIPTION OF THE PREFERRED EMBODIMENTS

Next, referring to the attached drawings, a solid oxide fuel cell device (SOFC) according to an embodiment of the present invention will be explained.

Figure 1:
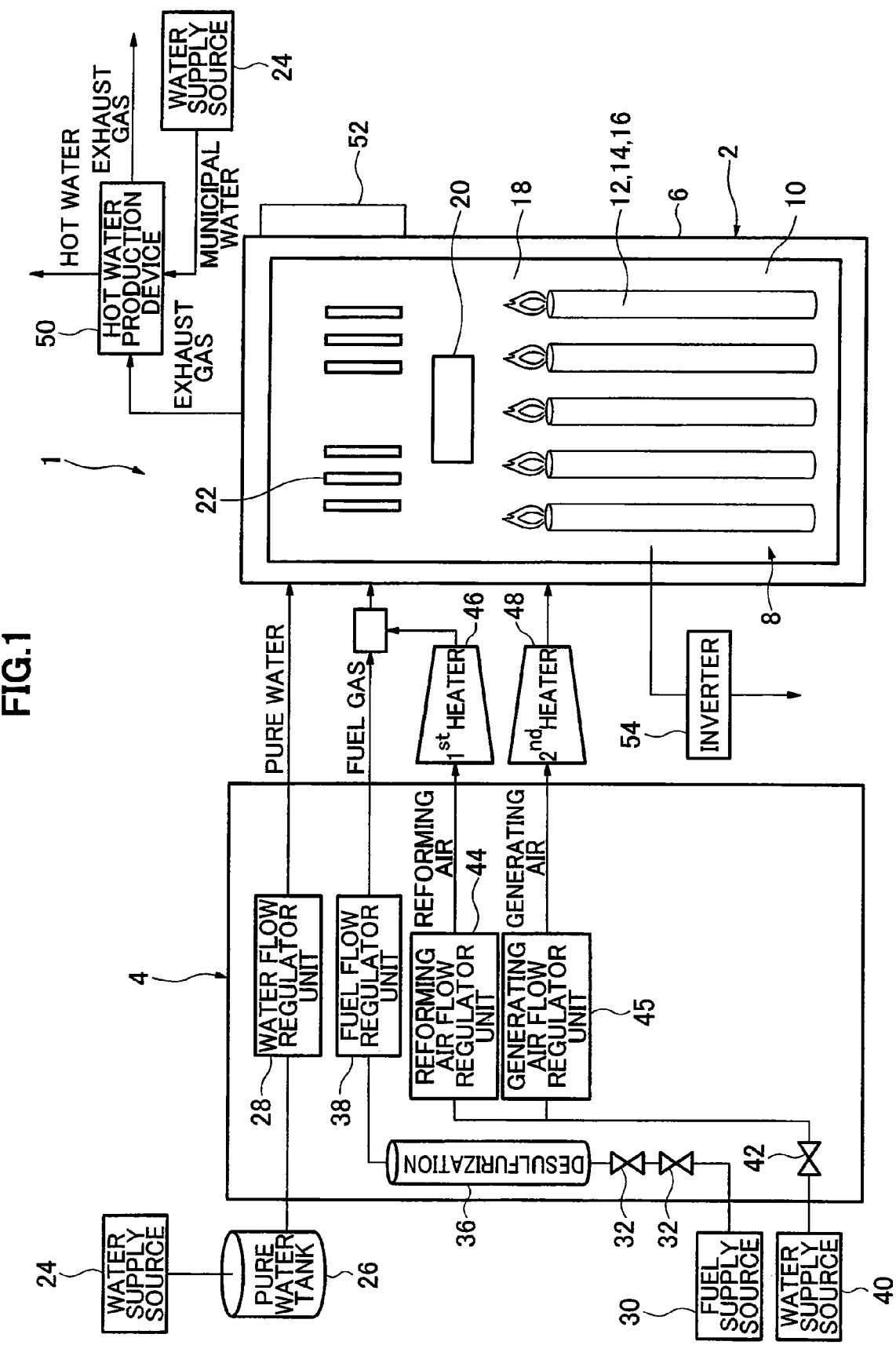
FIG. 1 is an overall schematic showing a solid oxide fuel cell device (SOFC) according to an embodiment of the present invention.

As shown in FIG. 1, a solid oxide fuel cell device (SOFC) according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
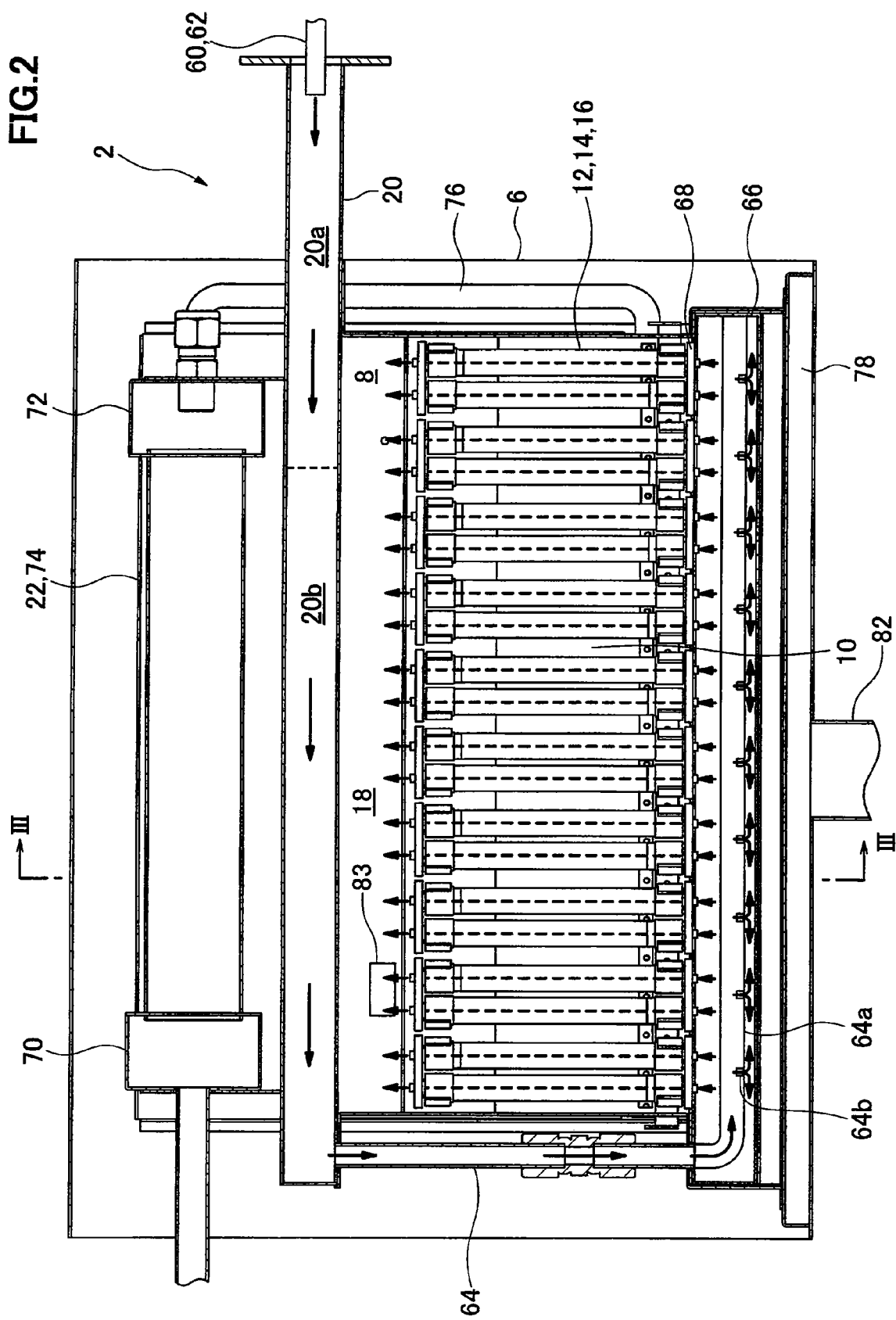
FIG. 2 is a front elevation sectional view showing a solid oxide fuel cell device (SOFC) fuel cell module according to an embodiment of the present invention.
Figure 3:
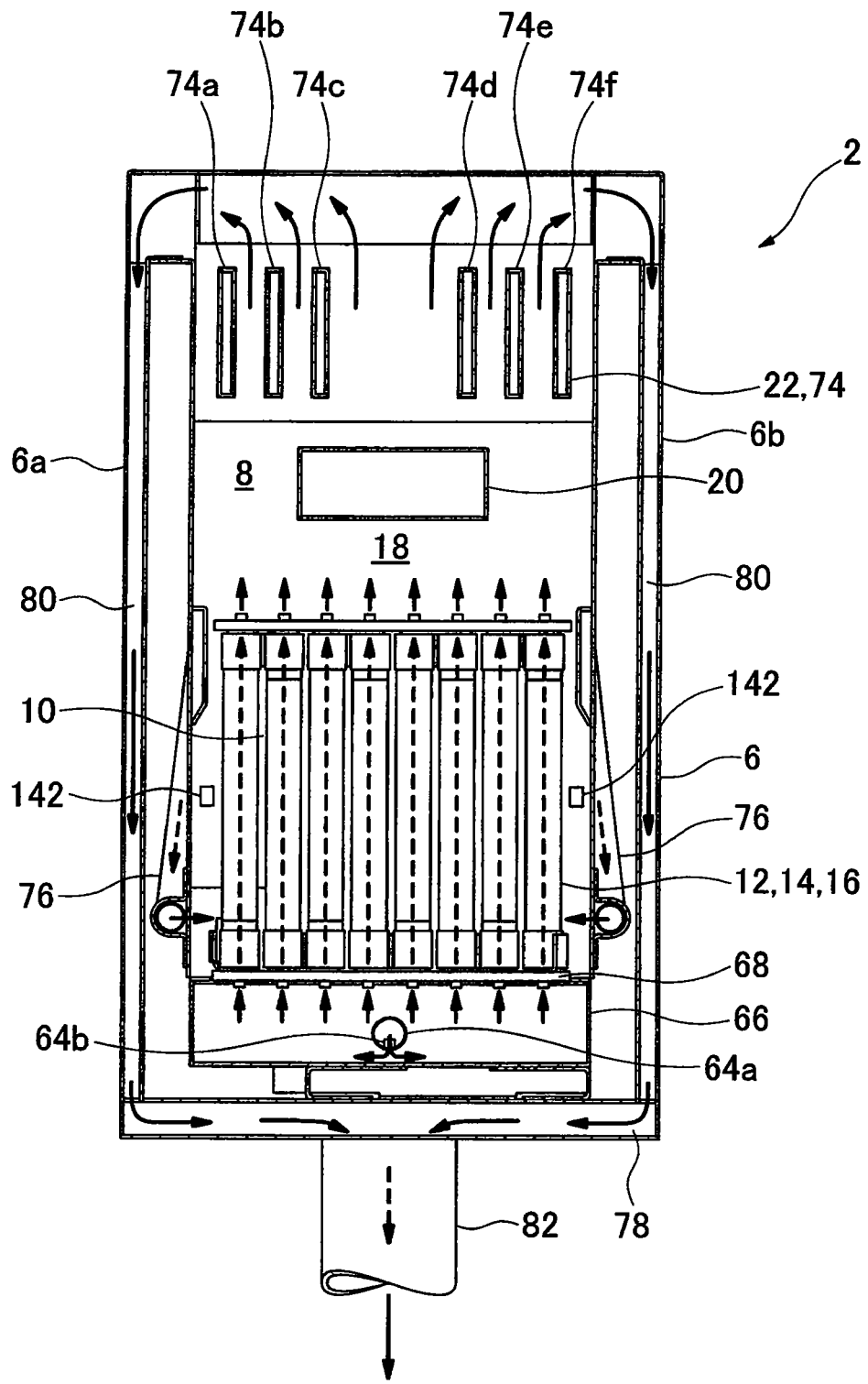
FIG. 3 is a sectional diagram along line in FIG. 2.

The internal structure of the solid oxide fuel cell device (SOFC) according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
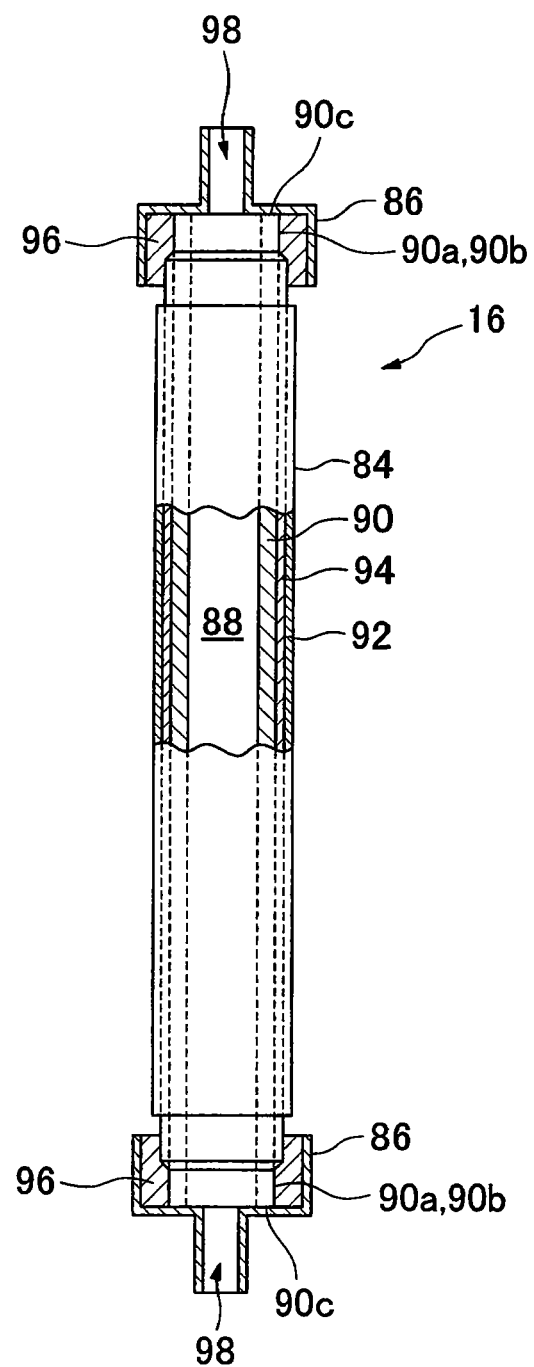
FIG. 4 is a partial section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
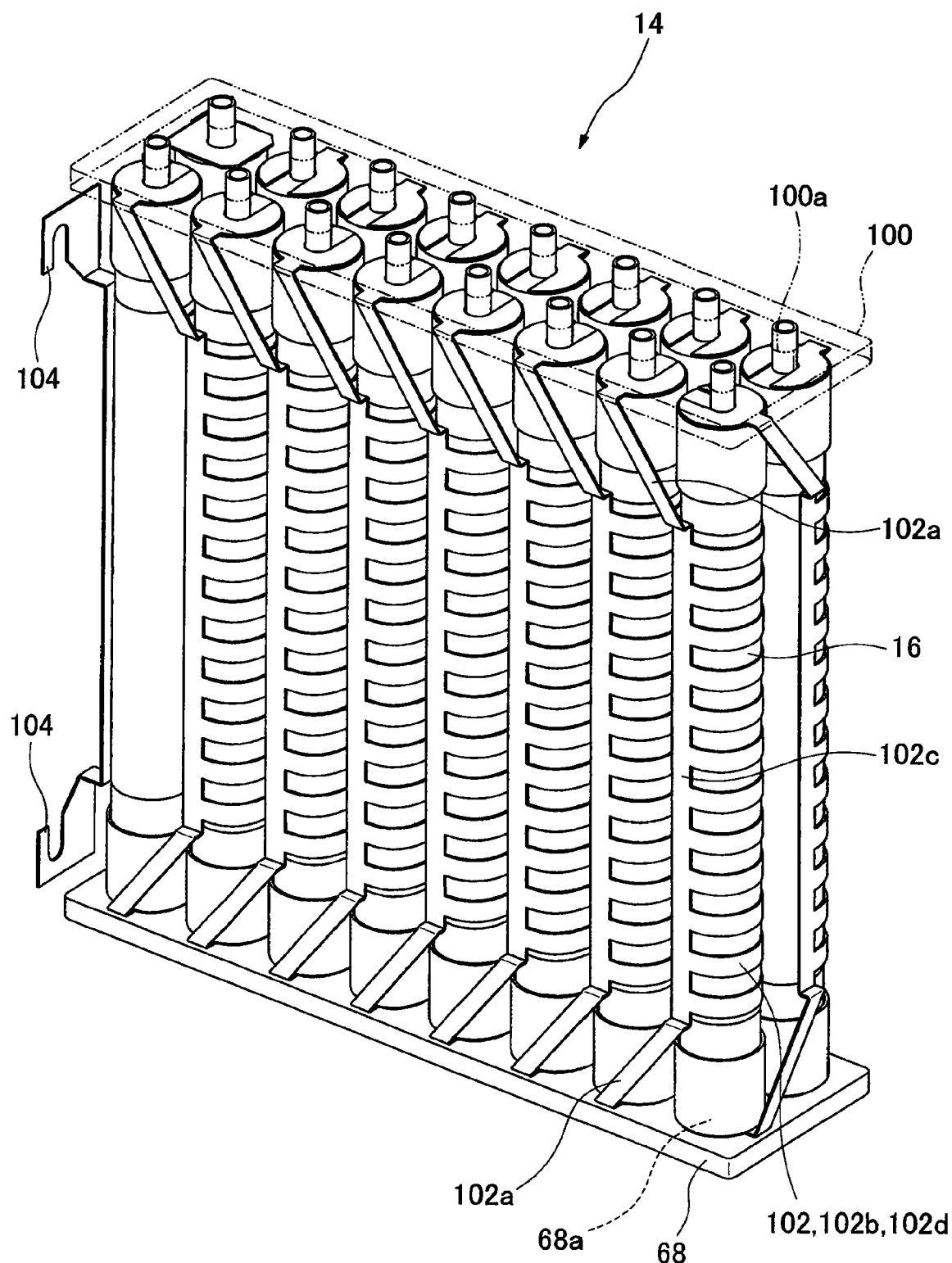
FIG. 5 is a perspective view showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell device (SOFC) according to the embodiment of the present invention will be explained.

Figure 6:
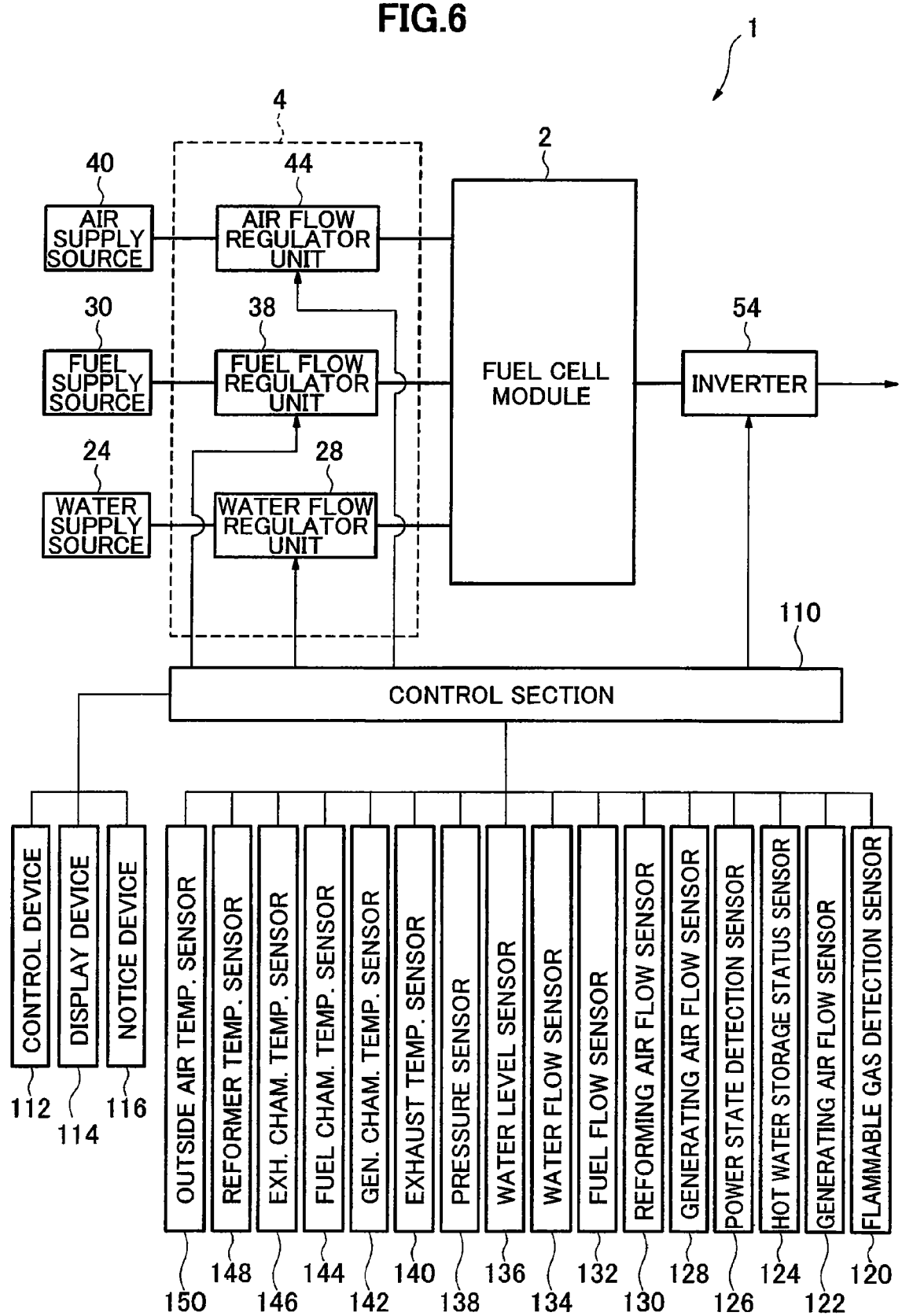
FIG. 6 is a block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell device (SOFC) is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
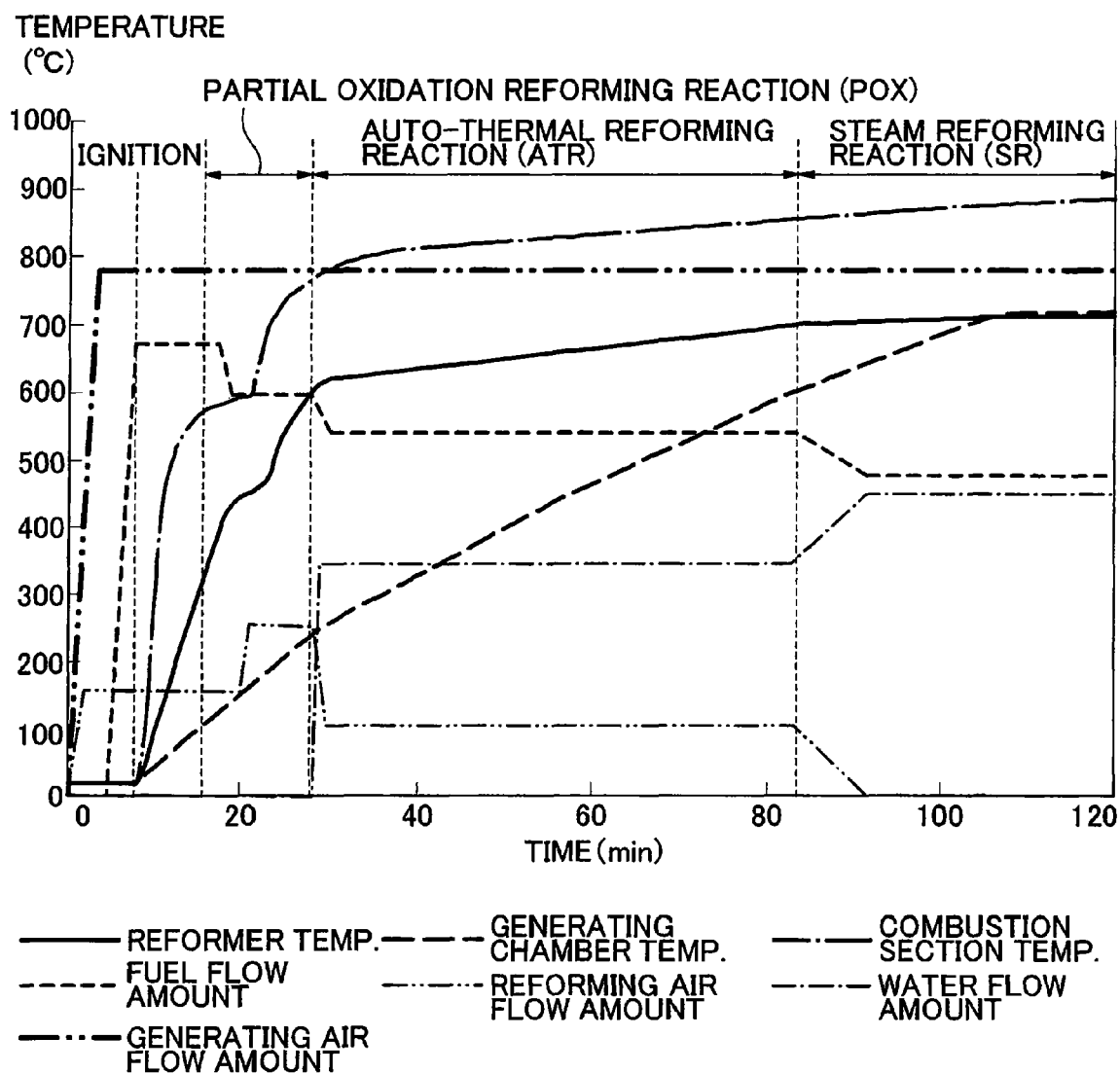
FIG. 7 is a timing chart showing the operation at the time of startup of a solid oxide fuel cell device (SOFC) according to an embodiment of the present invention.

Next, referring to FIG. 7, the operation of a solid oxide fuel cell device (SOFC) according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell device (SOFC) according to the embodiment of the present invention will be explained.

Figure 8:
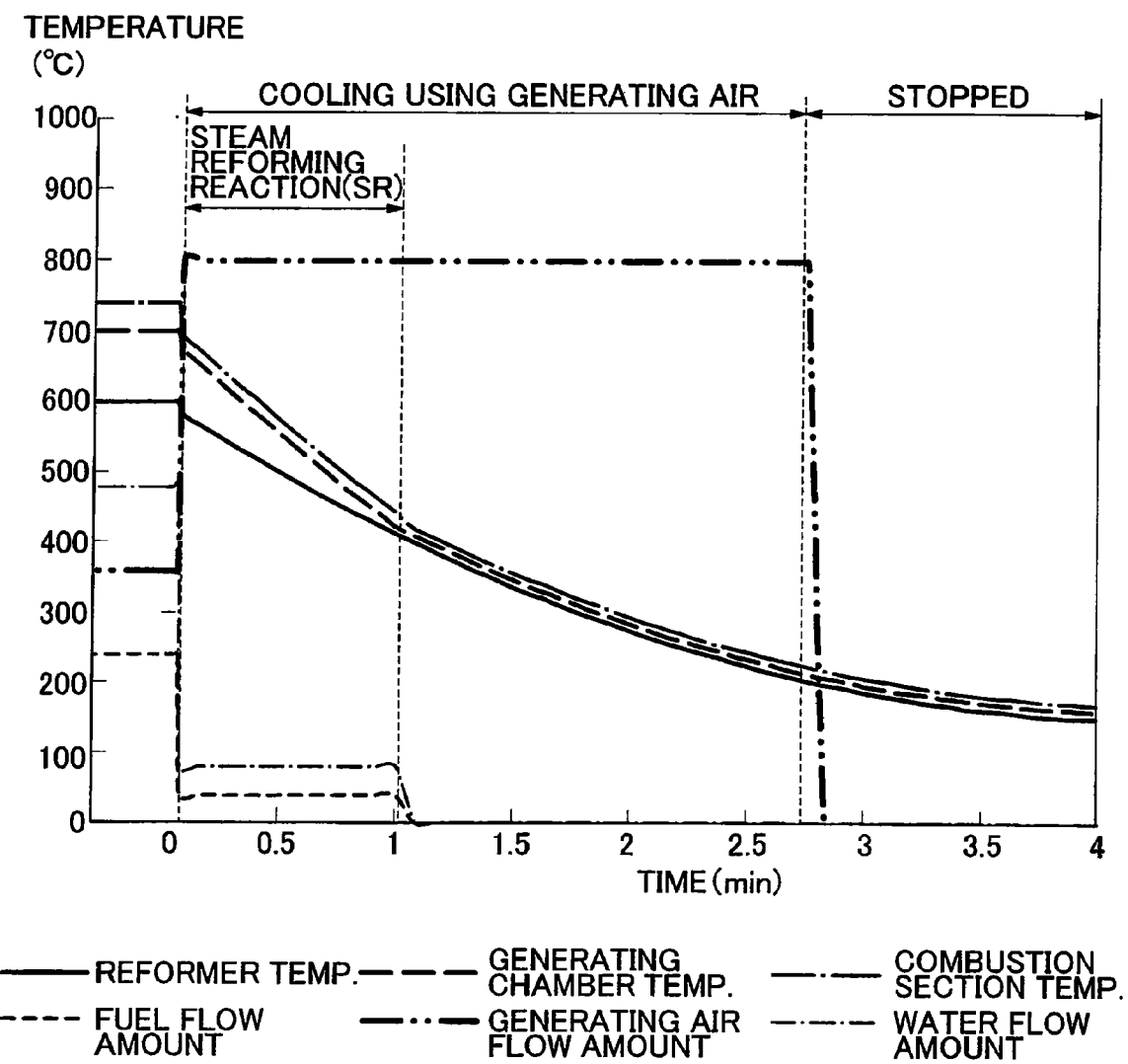
FIG. 8 is a timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIG. 9-11, the operation of a solid oxide fuel cell device (SOFC) according to the present embodiment at the time of restart will be explained. FIG. 9 is a data table showing fuel flow amount, reforming air flow amount, generating air flow amount, water flow amount, and reformer and stack transition temperature conditions in each of the states during normal startup and restart operations of a solid oxide fuel cell device (SOFC) according to an embodiment of the present invention.

First, as shown in FIG. 9, the solid oxide fuel cell device (SOFC) of the present embodiment is furnished with a control mode (the "Normal Startup Mode" below) for executing, as a normal startup operation, the same operation as that at startup of the solid oxide fuel cell device (SOFC) according to the present embodiment shown in FIG. 7 and described above.

The solid oxide fuel cell device (SOFC) of the present embodiment is furnished with a restart control mode (the "Restart Mode" below) for restarting when there is a request for startup operation ("Restart") in a state whereby a stop operation is being executed in the solid oxide fuel cell device (SOFC) according to the present embodiment shown in FIG. 8; these respective restart modes are executed based on the corresponding restart control flows.

Note that details of the normal mode and restart mode in FIG. 9 are discussed below.

Next, referring to FIG. 10, specifics of the restart control flow of a solid oxide fuel cell device (SOFC) according to the present embodiment will be explained. FIG. 10 is a flowchart showing the restart control flow for restarting a solid oxide fuel cell device (SOFC) according to an embodiment of the present invention. In FIG. 10, an S denotes the various steps.

First, in S1, a determination is made as to whether the fuel cell module 2 operation is stopped; if stopped, the system proceeds to S2, and a determination is made as to whether a restart is requested.

In S2, if it was determined that a restart is requested, the system advances to S3; after measuring the temperature of the reformer 20 (the "reformer temperature Tr") using the reformer temperature sensor 148 which forms part of a reforming state temperature detection means for detecting the reforming state temperature in order to change the reforming state of the reformer 20, the system advances to S4 and measures the stack temperature Ts, which is the temperature in the vicinity of the fuel cell stack 14 (i.e., the individual fuel cells 84 themselves) using a generating chamber temperature sensor 142, which forms part of the reforming state temperature detection means for detecting the reforming state temperature in order to change the reforming state of the reformer 20.

Next, advancing to S5, a determination is made as to whether the reformer temperature Tr is equal to or greater than 500° C.

In S5, if a determination is made that the reformer temperature Tr is not equal to or greater than 500° C., the system advances to S6 and determines if the reformer temperature Tr is less than 200° C.

In S6, if a determination is made that the reformer temperature Tr is not less than 200° C., i.e., that the reformer temperature Tr is equal to or greater than 200° C. and less than 500° C., the system advances to S7, and a determination is made as to whether the reformer temperature Tr is equal to or greater than 200° C. and less than 230° C.

In S7, if a determination is made that the reformer temperature Tr is not equal to or greater than 200° C. and less 230° C., i.e., that the reformer temperature Tr is equal to or greater than 230° C. and less than 500° C., the system advances to S8, and ignition of the fuel gas by the ignition device 83 is prohibited, restart is held off, and operation stoppage is continued.

At the point in time when the reformer temperature Tr declines to a temperature band equal to or greater than 200° C. and less than 230° C., the system advances from S7 to S9; ignition of the fuel gas by the ignition device 83 commences, and "Restart POX" using the "Restart Mode" in the data table shown in FIG. 9 is executed immediately following ignition.

Also, if a determination is made in S5 that the reformer temperature Tr is equal to or greater than 500° C., the system advances to S10 and determines if the reformer temperature Tr is equal to or greater than 600° C.

If a determination is made in S10 that the reformer temperature Tr is not equal to or greater than 600° C., i.e., that the reformer temperature Tr is equal to or greater than 500° C. and less than 600° C., the system advances to S11, and "Normal Startup ATR" is executed based on the "Restart Mode" in the data table shown in FIG. 9.

On the other hand, if it is determined in S10 that the reformer temperature Tr is equal to or greater than 600° C., the system advances to S12, and determines whether the stack temperature Ts measured by the generating chamber temperature sensor 142 is equal to or greater than 600° C.

If a determination is made in S12 that the stack temperature Ts is equal to or greater than 600° C., the system advances to S13, and "Normal Startup SR" is executed based on the "Restart Mode" in the data table shown in FIG. 9. On the other hand, if a determination is made in S12 that the stack temperature Ts is not equal to or greater than 600° C., i.e., that the stack temperature Ts is less than 600° C. notwithstanding that the reformer temperature Tr is equal to or greater than 600° C., the system advances to S11, and "Normal Startup ATR" is executed based on the "Restart Mode" in the data table shown in FIG. 9.

Next, a determination is made in S1 as to whether the fuel cell module 2 operation is stopped; if not stopped, the system advances to S14 and determines whether a there is a request for restart based on loss of flame.

If it is determined in S14 that there is a request for restart based on loss of flame and it is determined in S6 that the reformer temperature Tr is less than 200° C., then even if the temperature sensor value appears high, this does not mean the entire fuel cell module is in a long-duration high temperature state, therefore given that heat is not uniformly accumulated, this is not a situation in which a residual heat-based restart control can be executed, so the system advances to S15 and restart is executed based on the "Normal Startup Mode" in the data table shown in FIG. 9.

Figure 10:
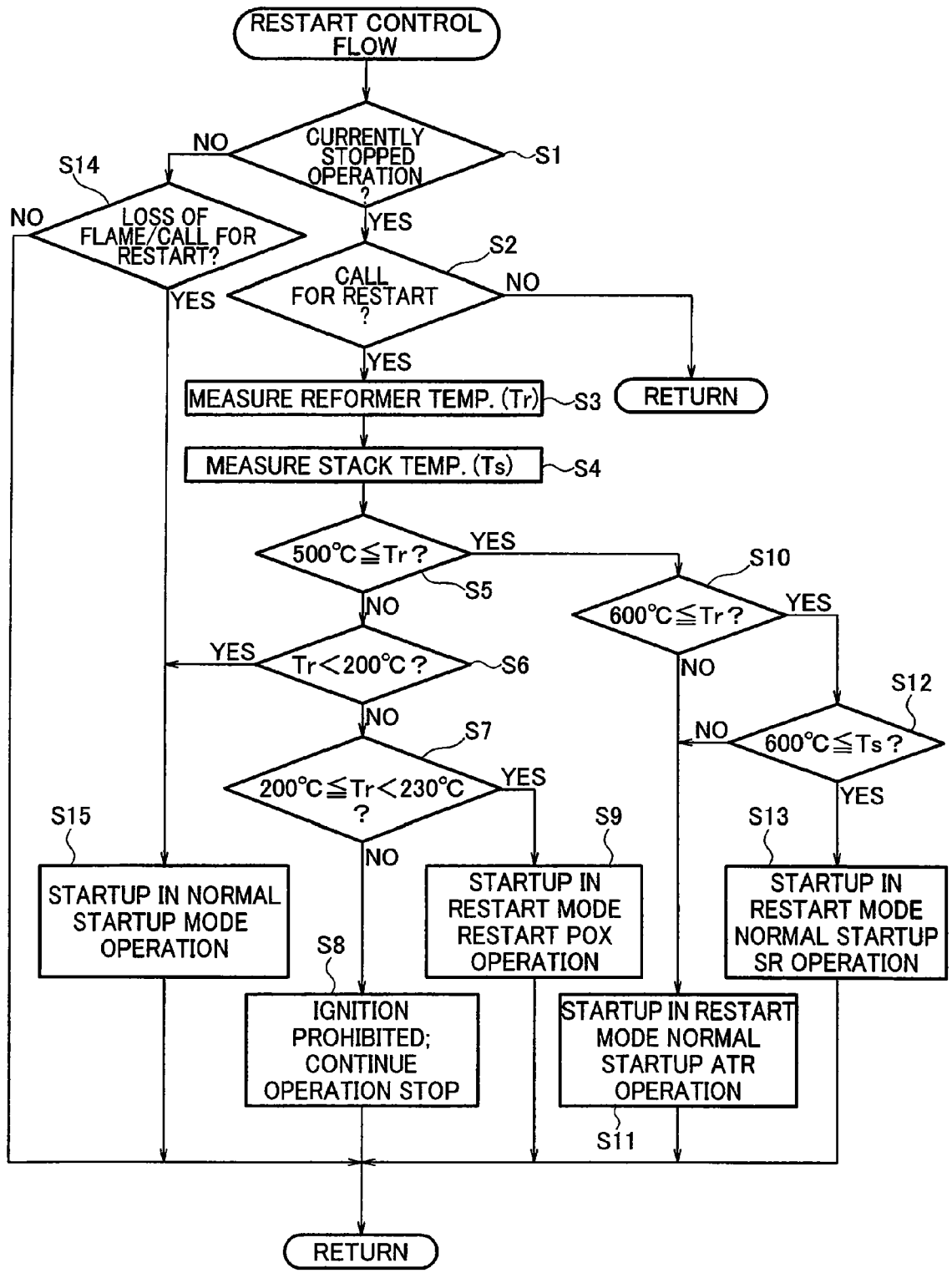
FIG. 10 is a flowchart showing the restart control flow for restarting a solid oxide fuel cell device (SOFC) according to an embodiment of the present invention.
Figure 11:
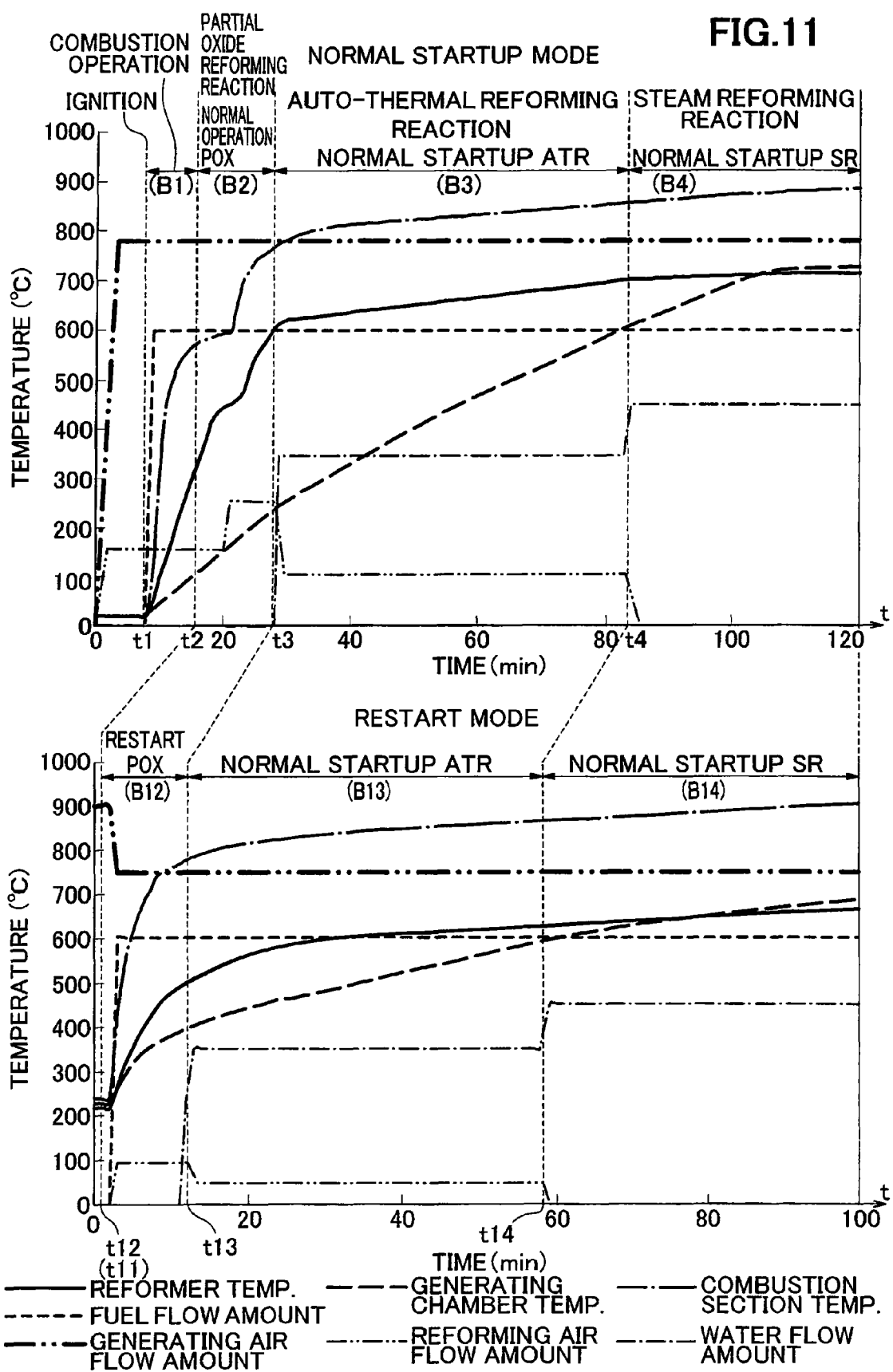
FIG. 11 is a diagram comparing a timing chart showing operations when restart is executed based on the restart control flow for the solid oxide fuel cell device (SOFC) according to an embodiment of the present invention shown in FIG. 10 with a timing chart showing normal startup operations.

Next, referring to FIG. 9-11, the operation when a restart is executed based on the restart control flow of the solid oxide fuel cell device (SOFC) according to this embodiment as shown in FIG. 10 will be specifically explained.

FIG. 11 is a diagram comparing a timing chart showing operation when restart is executed based on the restart control flow in a solid oxide fuel cell device (SOFC) according to an embodiment of the present invention shown in FIG. 10 with a timing chart showing normal startup operations.

Note that the timing chart on the upper row of FIG. 11 shows the normal startup operation of a solid oxide fuel cell device (SOFC) when the "Normal Startup Mode" in the data table in FIG. 9 is executed; the timing chart on the lower row of FIG. 11 shows the restart operation for a solid oxide fuel cell device (SOFC) when the "Restart Mode" in the FIG. 9 data table is executed.

Regarding an explanation of the restart operation based on the restart control flow for a solid oxide fuel cell device (SOFC) according to the embodiment below, the data table shown in FIG. 9 for the "Normal Startup Mode" and the "Restart Mode;" the operation at restart by the "Restart Mode" in the solid oxide fuel cell device (SOFC) shown in FIG. 11 is discussed in comparison with the normal startup operation using the "Normal Startup Mode" are only referred to.

First the reading of the "Normal Startup Mode" data table shown in FIG. 9 will be explained.

The "State" column in the "Normal Startup Mode" shown in FIG. 9 shows the respective operating states upon normal startup from the top row to the bottom row in temporal order; the various operating states are separated into categories abbreviated as "Time of Ignition," "Combustion Operation," "Normal Startup POX," "Normal Startup ATR," and "Normal Startup SR."

The times t shown along the horizontal axis of the timing chart in the "Normal Startup Mode" in FIG. 11 are referred to as t1 for the "Time of Ignition," then t2, t3, and t4 for the sequential transitions through "Normal Startup POX," "Normal Startup ATR," and "Normal Startup SR;" the temperature of the reformer 20 detected by the reformer temperature sensor 148 at a time t is referred to as Tr(t), and the stack temperature measured by the generating chamber temperature sensor 142 at a time t is referred to as Ts(t).

The operating state referred to as "Time of Ignition" in the "Normal Startup Mode" is the state which turns on the ignition device 83, ignites the fuel gas, and starts combustion; if the temperature of the reformer 20 detected by the reformer temperature sensor 148 at the time of this ignition (t=t1) is deemed "temperature at time of ignition Tr(t1)," then this temperature at time of ignition Tr(t1) is lower than the temperature of the reformer 20 at the start of POX (t=t2)) ("POX Starting Temperature Tr(t2)" below) (=300° C.).

Next, the "Combustion Operation" in the "Normal Startup Mode" operating state is one in which, after starting combustion following ignition of the fuel gas, startup is controlled in a control band ("Combustion Operation Control Band B1" below) for executing a combustion operation by heating the reformer 20 through combustion of this fuel gas in a temperature band W1 in which the temperature of the reformer 20 detected by the reformer temperature sensor 148 is between the temperature at time of ignition Tr(t1), up to a temperature less than the POX starting temperature Tr(t2) (=300° C.).

Next, when the operating state referred to as the "Normal Startup POX" in the "Normal Startup Mode" is one in which the temperature Tr(t) of the reformer 20 detected by the reformer temperature sensor 148 is at the POX starting temperature Tr(t2) (=300° C.) or greater, and SR is within a temperature range (the "Normal Startup POX Temperature Band W2" below) less than the temperature at which SR is possible (the "SR Feasible Temperature Tr(t3)" below) (=600° C.) (300° C.≤Tr(t)<600° C.), startup is controlled in the control band in which POX is executed by heating the reformer 20 using the reaction heat from POX and the combustion heat of the fuel gas (the "Normal Startup Mode POX Control Band B2" below).

Next, when the operating state referred to as the "Normal Startup ATR" in the "Normal Startup Mode" is one in which, when in a temperature band in which the temperature Tr(t) of the reformer 20 detected by the reformer temperature sensor 148 is equal to or greater than the temperature at which SR is possible Tr(t3) (=600° C.) and less than a predetermined steady state temperature Tr(t4) (=650° C.) (the "Normal Startup ATR Temperature Band W3" below), (i.e., 600° C.≤ Tr(t)<650° C.), and the stack temperature Ts measured by the generating chamber temperature sensor 142 is in a temperature band equal to or greater than 250° C. and less than 600° C. (250° C.≤Tx<600° C.), the reaction heat from POX, the combustion heat of fuel gas, and the absorption of heat by SR are controlled to heat the reformer 20 and startup is controlled in the control band for executing ATR (the "Normal Startup ATR Control Band B3" below).

Next, the "Normal Startup SR" in "Normal Startup Mode" operating mode is one in which, when the temperature Tr(t) of the reformer 20 detected by the reformer temperature sensor 148 is at a predetermined steady state temperature Tr(t4) at or above 650° C., and the stack temperature Ts measured by the generating chamber temperature sensor 142 is at or above 600° C., startup is controlled in the control band (the "Normal Startup Mode SR Control Band B4" below) in which SR is executed.

Note that in the "Fuel Flow Amount" column in FIG. 9, what is shown is the flow amount (L/min) of fuel gas supplied to the reformer 20 from the fuel flow regulator unit 38 which serves as the fuel gas supply means of the auxiliary unit 4.

The "Reforming Air Flow Amount" column in FIG. 9 shows for each operating state, the flow amount (L/min) of oxidizing gas (reforming air) supplied from the reforming air flow regulator unit 44, which serves as the oxidant gas supply means for the auxiliary unit 4, to the reformer 20 via the first heater 46, which serves as oxidizing gas heating means.

Furthermore, the "Generating Air Flow Amount" column in FIG. 9 shows, for each operating state, the flow amount (L/min) of generating air supplied from generating air flow regulator unit 45 of the auxiliary unit 4 to the electrical generating chamber 10 via the second heater 48.

The "Water Flow Amount" column in FIG. 9 shows the flow amount (cc/min) of pure water supplied to the reformer 20 from the water flow regulator unit 28 of the auxiliary unit 4, which is the water supply means for producing pure water and supplying it the reformer 20.

Furthermore, the "Reformer Temperature" and "Stack Temperature" columns under "Transition Temperature Conditions" shown in FIG. 9 indicate the reformer 20 temperature and fuel cell stack 14 temperature when the operating state transitions to the next operating state.

To explain this more specifically, the "Reformer Temperature" of "Transition Temperature Conditions" in the state column under the "Combustion Operation" in the "Normal Startup Mode" shows "300° C. or greater," this means that the transition from the "Combustion Operation" operating state to the "Normal Startup POX" operating state occurs when a reformer 20 temperature Tr(t) detected by the reformer temperature sensor 148 reaches 300° C. or above.

Similarly, the "Reformer Temperature" of the "Transition Temperature Conditions" in the state column under the "Normal Startup POX" in the "Normal Startup Mode" shows "600° C. or greater," and the "Stack Temperature" shows "250° C. or greater," this means that the transition from the "Normal Startup POX" operating state to the "Normal Startup ATR" operating state occurs when the reformer 20 temperature Tr(t) detected by the reformer temperature sensor 148 reaches 600° C. or above, and the stack temperature Ts measured by the cell temperature sensor 142 reaches 250° C. or above.

Next the reading of the "Restart Mode" data table shown in FIG. 9 will be explained, but because this is basically the same as the reading of the "Normal Startup Mode" described above, we will focus on the points of difference and features relative to the "Normal Startup Mode" data table.

First, the "State" column in the "Restart Mode" shown in FIG. 9 shows the respective operating states upon restart from the top row to the bottom row in temporal order; the various operating states are separated into categories abbreviated as "Time of Ignition," "Restart POX," "Ignition Prohibition," "Normal Startup ATR," and "Normal Startup SR."

Note that with respect to the times t on the horizontal axis of the "Restart Mode" timing chart, the time of the "Ignition Time" is referred to as t11, and the times at which the transitions occur in sequence to "Restart POX," "Normal Startup ATR," and "Normal Startup SR" are respectively referred to as t12, t13, and t14.

Next, the operating state shown in FIG. 9 and referred to as "Time of Ignition" under "Restart Mode" is one in which, when there is a request for restart while the fuel cell module 2 operation is stopped, a normal startup based on the "Normal Startup Mode" is executed starting with the "Combustion Operation" following ignition in the "Normal Startup Mode" (see S6 and S15 in FIG. 10) when the temperature Tr(t) of the reformer 20 detected by the reformer temperature sensor 148 is less than a predetermined temperature Tr(t11) (=200° C.), which is below POX starting temperature Tr(t2) (=300° C.) of the normal startup mode POX control band B2 in the "Normal Startup Mode".

On the other hand, when the reformer 20 temperature Tr(t11) is at or above a predetermined temperature (=200° C.), the ignition device 83 turns on and the fuel gas is ignited, following immediately which there is a transition to the "Restart POX" operating state in the "Restart Mode".

Note that the "Fuel Flow Amount" of "Time of Ignition" in the "Restart Mode" shown in FIG. 9 is 5.5 (L/min), which is less than the "Fuel Flow Amount" (6.0 L/min) of the "Time of Ignition" under the "Normal Startup Mode."

Next, the operating state shown in FIG. 9 and S9 of FIG. 10 and referred to as the "Restart POX" in the "Restart Mode" is one in which, when the temperature Tr(t11) of the reformer 20 detected by the reformer temperature sensor 148 is equal to or greater than a predetermined temperature (=200° C.), there is an immediate transition after turning on the ignition device 83 and igniting the fuel gas, and restart is controlled in the control band in which POX is executed (the "Restart Mode POX Control Band B12" below).

The "Restart POX" operating state executed in the restart mode POX control band B12 of the "Restart Mode" differs from the "Normal Startup POX" operating mode executed in the normal startup mode POX control band B2 of the "Normal Startup Mode."

To explain this in more detail, the reformer 20 temperature band in which the "Restart POX" is executed in the restart mode POX control band B12 of the "Restart Mode" (the "Restart POX temperature band W12" below) is a lower temperature band (200° C.<Tr(t)<500° C.) than the normal startup POX temperature band W2 (300° C.≤Tr(t)<600° C.) in which the "Normal Startup POX" is executed in the normal startup mode POX control band B2 of the "Normal Startup Mode."

Also, the "Fuel Flow Amount" in the "Restart POX" operating state in the "Restart Mode" is 5.5 L/min, which is less than the "Fuel Flow Amount" in the "Time of Ignition" and "Combustion Operation" operating modes in the "Normal Startup Mode" (6.0 L/min), but greater than the "Fuel Flow Amount" (5.0 L/min) in the "Normal Startup POX" operating state in the "Normal Startup Mode".

Furthermore, the "Reforming Air Flow Amount" in the "Restart POX" operating state in the "Restart Mode" is 17.0 L/min, which is less than the "Reforming Air Flow Amount" (18.0 L/min) in the "Normal Startup POX" operating state in the "Normal Startup Mode".

Next, the operating state referred to at "Ignition Prohibited" under "Restart Mode" shown in FIG. 9 prohibits the ignition of fuel gas by the ignition device 83 and prohibits restart, controlling restart in a control band (the "Restart Mode ignition prohibition control band" below) in which operation continues to be stopped (see FIG. 10, S8).

To explain this more specifically, the reformer 20 temperature band (the "Ignition Prohibited Temperature Band" below) in which "Ignition Prohibition" is executed in the restart mode ignition prohibited control band in the "Restart Mode", is a temperature band greater than or equal to 230° C. and less than 500° C., which is higher than the restart POX temperature band W12 of the "Restart Mode".

In the restart mode ignition prohibition control band in the "Restart Mode", the "Normal Startup POX" in the "Normal Startup Mode" in particular is not executed, notwithstanding that a portion within the "Restart Mode" ignition prohibition temperature band equal to or greater than 230° C. and less than 500° C. overlaps with a portion of the temperature band within the normal startup POX temperature band W2 (300° C.≤Tr(t)<600° C.) in the "Normal Startup Mode".

Furthermore, in the restart mode ignition prohibited control band in the "Restart Mode", ignition of the fuel gas by the ignition device 83 starts at the point when the reformer temperature Tr declines from being within the ignition prohibition temperature band (230≤Tr<500° C.) to a temperature under 230° C.; the "Restart POX" in the "Restart Mode" of the FIG. 9 data table is then executed immediately following this ignition (see S7 and S9 in FIG. 10).

Next, the operating state referred to as the "Normal Startup ATR" in the "Restart Mode" shown in FIG. 9 and S11 in FIG. 10 controls startup in the control band (the "Restart Mode ATR control band B13" below) for executing the same ATR as the "Normal Startup ATR" in the "Normal Startup Mode" when the temperature Tr(t) of the reformer 20 is within a temperature band corresponding to the normal startup POX temperature band W2 of the "Normal Startup Mode", and is within a temperature band (the "Restart ATR temperature band W13" below), at or above 500° C. and below 600° C., which is in turn higher than the "Restart Mode" ignition prohibition temperature band.

Next, the operating state referred to as "Normal Startup SR" in the "Restart Mode" in FIG. 9 and S13 in FIG. 10 controls restart in the control band (the "Restart Mode SR control band B14" below) for executing the same SR as the "Normal Startup SR" in the "Normal Startup Mode" using the same conditions as the transition temperature conditions" in the "Normal Startup SR" in the "Normal Startup Mode."

As shown in FIG. 11, the time t13 over which the transition from the "Restart POX" in the "Restart Mode" to the "Normal Startup ATR" occurs is a shorter time than the time t3 over which the transition from the "Normal Startup POX" in the "Normal Startup Mode" to the "Normal Startup ATR" occurs.

Furthermore, the time t14 over which the transition from the "Restart Mode" "Normal Startup ATR" to the "Normal Startup SR" occurs is also shorter than the time t4 over which the transition from the "Normal Startup ATR" in the "Normal Startup Mode" to the "Normal Startup SR" occurs, and the startup time in restart is shorter compared to startup time in normal startup.

Using the startup control according to the restart control flow of the solid oxide fuel cell device (SOFC) in the above described embodiment, when the reformer 20 temperature Tr(t) is within a temperature band corresponding to the normal startup POX temperature band W2 of the "Normal Startup Mode" due to stoppage of the operation of the fuel cell module 2, execution of the "Normal Startup POX" in the normal startup mode POX control band B2 in the "Normal Startup Mode" is prohibited by the active utilization of residual heat remaining in the fuel cell stack 14 or the reformer 20, even if the reformer 20 temperature Tr(t) is within the normal startup POX temperature band W2, and a restart control different from this "Normal Startup POX" can be executed in place of the prohibited "Normal Startup POX" in "Normal Startup Mode."

As a result, when compared to the case in which the normal startup POX is executed without prohibiting the execution of the normal startup POX in the normal startup mode POX control band B2 under the "Normal Startup Mode," oxidation of the fuel cells 84 and the burden on the fuel cells 84 caused by anomalously high temperatures can be reduced, and the durability of the fuel cells 84 improved.

A major reduction in startup time can be achieved by executing a restart control different from the "Normal Startup POX" in the "Normal Startup Mode" through the active use of residual heat remaining in the fuel cells 84 or the reformer 20.

Furthermore, because it is possible to prohibit startup by the "Restart Mode" and to execute startups by the "Normal Startup Mode" when startup is carried out based on loss of flame upon startup (see S14 and S15 in FIG. 10), damage to the fuel cell unit 16 can be restrained.

By using restart control according to the restart control flow in the solid oxide fuel cell device (SOFC) of the present embodiment, in the restart ATR temperature band W13 (500° C.≤Tr<600° C.) of the "Restart Mode", which is higher than the ignition prohibition band (230° C.≤Tr<500° C.) in the "Restart Mode", the same ATR as the normal startup ATR in the normal startup mode ATR control band B3 of the "Normal Startup Mode" is executed, whereas in the ignition prohibition temperature band (230° C.≤Tr<500° C.) in the "Restart Mode", restart by "Normal Startup POX" in the "Normal Startup Mode" is prohibited and, after waiting for the reformer 20 temperature Tr(t) to decline to below 230° C., a restart is executed by "Restart POX" in the "Restart Mode," thereby restraining damage to the fuel cells 84 caused by execution of POX in a high temperature state, while promptly recovering the temperature of the fuel cell module through the exothermic POX reaction for a quick restart.

Furthermore, by using the restart control according to the restart control flow in the solid oxide fuel cell device (SOFC) of the present embodiment, residual heat remaining in the fuel cells 84 or the reformer 20 at the time of restart is actively utilized to expand the temperature range over which the "Normal Startup ATR" in the "Restart Mode" is executed to a range (500° C.≤Tr<600° C.) above a predetermined temperature within the normal startup POX temperature band W2 in the "Normal Startup POX" of the "Normal Startup Mode", thus enabling a temperature rise in a stable state and over a short time, while restraining effects on the fuel cells 84.

In other words, in the "Normal Startup Mode" normal startup POX temperature band W2 (300° C.≤Tr<600° C.; Ts<250° C.), operating range of the "Normal Startup ATR" in the "Restart Mode" is expanded to above a predetermined temperature (500° C.≤Tr<600° C.) within the POX temperature band W2 (300° C.≤Tr<600° C., Ts<250° C.) of the "Normal Startup Mode" so that the "Normal Startup ATR" in the "Restart Mode" can be executed; below a predetermined temperature at which there is no oxidation effect (200° C.≤Tr<230° C.), restart is brought about by the "Restart POX" in the "Restart Mode"; by prohibiting startup in the midrange temperatures (230°≤Tr<500° C.) and performing stop control processing to lower the temperature and then restarting, the temperature can be raised in a stable state and in a short period of time while restraining effects on the fuel cell stack 14.

Also, by using the restart control according to the restart control flow in the solid oxide fuel cell device (SOFC) of the present embodiment, expeditious startup is enabled in the restart mode POX control band B12 in which the "Restart POX" of the "Restart Mode" is executed through active use of residual heat remaining in the fuel cells 84 or the reformer 20, whereas "Restart POX" can be executed with a less oxidizing gas (reforming air) than the amount of oxidizing gas (reforming air) supplied to the reformer 20 from the reforming air flow regulator unit 44 serving as the oxidizing gas supply means in the normal startup mode POX control band B2 in which the "Normal Startup POX" in the "Normal Startup Mode" is executed, thereby preventing oxidation effects on the fuel cell stack 14 under the influence of residual heat caused by the introduction of large amounts of oxidizing gas.

EXPLANATION OF REFERENCE NUMERALS

1: Solid oxide fuel cell device (SOFC)
2: Fuel cell module
4: Auxiliary unit
8: Sealed space
10: Electrical generating chamber
12: Fuel cell assembly
14: Fuel cell stack
16: Fuel cell unit
18: Combustion chamber
20: Reformer
22: Heat exchanger for air
24: Water supply source
26: Pure water tank
28: Water flow regulator unit
30: Fuel supply source
38: Fuel flow regulator unit
40: Air supply source
44: Reforming air flow regulator unit
45: Generating air flow regulator unit
46: First heater
48: Second heater
50: Hot water production device
52: Control box
54: Inverter
83: Ignition device
84: Fuel cells
110: Control section
112: Operating device
114: Display device
116: Warning device
126: Electrical power state detecting sensor
142: Cell temperature sensor
150: Outside air temperature sensor

What is claimed is:

1. A solid oxide fuel cell system for generating electricity through an electro-chemical reaction of a fuel gas and an oxidation gas, comprising:

solid oxide fuel cells disposed within a solid oxide fuel cell module which is thermally prepared for generation of electricity through a series of startup operations comprising a partial oxidation reforming reaction (POX) operation, an auto-thermal reforming reaction (ATR) operation, and a steam reforming reaction (SR) operation;

a reformer that reforms the fuel gas and supplies the reformed fuel gas to the fuel cells;

a temperature detector that detects a reforming state temperature in order to change a state of reforming reaction that occurs in the reformer; and a controller programmed to control operations of the solid oxide fuel cell module, the controller comprising a startup control device programmed to control the startup operations of the solid oxide fuel cell module, and a stop control device programmed to control a stop operation of the solid oxide fuel cell module;

wherein the startup control device is programmed to execute a combustion operation to raise a temperature of the reformer with heat of combusting fuel gas when, after the fuel gas is ignited and caused to combust, the reforming state temperature detected by the temperature detector is lower than a POX starting temperature at which the POX operation is able to start, the startup control device is further programmed to execute the POX operation to raise the temperature of the reformer when the reforming state temperature is equal to or higher than the POX starting temperature and falls within a POX temperature range lower than a temperature at which a steam reforming reaction is able to occur, the startup control device is further programmed to execute the ATR operation to raise the temperature of the reformer when the reforming state temperature equal to or higher than a temperature at which the steam reforming is able to occur and falls within an ATR temperature range lower than a predetermined steady state temperature, and the startup control device is further programmed to execute the SR operation to raise the temperature of the reformer when the reforming state temperature is equal to or higher than the predetermined steady-state temperature, and wherein the startup control device is further programmed to restart the startup operations with a startup operation different from the POX operation, in response to a restart request if received when the reforming state temperature is in a high temperature region within the POX temperature range, while the stop control device is executing the stop operation to thereby cause the solid oxide fuel cell module to be cooling down from a high temperature.

2. The solid oxide fuel cell system according to claim 1, wherein the startup control device is programmed to restart the startup operations from the ATR operation when the reforming state temperature is within the ATR temperature range, and the startup control device is further programmed to prohibit restarting the startup operations from the POX operation when the reforming state temperature is within the POX temperature range, the stop control device is programmed to continue the stop operation until the reforming state temperature declines to a first predetermined temperature, and the startup control device is programmed to restart the startup operations after the reforming state temperature reaches the first predetermined temperature.

3. The solid oxide fuel cell system according to claim 2, wherein the startup control device is programmed to prohibit restarting the startup operations from the POX operation when the reforming state temperature is equal to or higher than a predetermined temperature within the POX temperature range, and the stop control device is programmed to continue the stop operation until the reforming state temperature reaches a temperature lower than the predetermined temperature, and the startup control device is programmed to restart the startup operations from the POX operation after the temperature drops to a temperature lower than the predetermined temperature.

4. The solid oxide fuel cell system according to claim 2, wherein the startup control device is programmed to restart the startup operations from the ATR operation when the reforming state temperature is in a first temperature region higher than a first predetermined temperature within the POX temperature range, the startup control device is further programmed to restart the startup operations from the POX operation when the reforming state temperature is in a second temperature region lower than the first temperature region within the POX temperature range, the startup control device is further programmed to prohibit restarting the startup operations when the reforming state temperature is in a third temperature region between the first temperature region and the second temperature region, the stop control device is programmed to continue the stop operation until the reforming state temperature falls to a temperature lower than the first predetermined temperature, and the startup control device is programmed to restart the startup operations from the POX operation after the reforming state temperature reaches a temperature lower than the first predetermined temperature.

5. The solid oxide fuel cell system according to claim 3, wherein the startup control device is programmed to restart the startup operations from the ATR operation when the reforming state temperature is in a first temperature region higher than a first predetermined temperature within the POX temperature range, the startup control device is further programmed to restart the startup operations from the POX operation when the reforming state temperature is in a second temperature region lower than the first temperature region within the POX temperature range, the startup control device is further programmed to prohibit restarting the startup operations when the reforming state temperature is in a third temperature region between the first temperature region and the second temperature region, the stop control device is programmed to continue the stop operation until the reforming state temperature falls to a temperature lower than the first predetermined temperature, and the startup control device is programmed to restart the startup operations from the POX operation after the reforming state temperature reaches a temperature lower than the first predetermined temperature.

6. The solid oxide fuel cell system according to claim 3, wherein the startup control device is programmed to supply, when restarting the startup operations from the POX operation, a reduced amount of oxidizing gas compared to that normally supplied in the POX operation.

7. The solid oxide fuel cell system according to claim 4, wherein the startup control device is programmed to supply, when restarting the startup operations from the POX operation, a reduced amount of oxidizing gas compared to that normally supplied in the POX operation.

8. The solid oxide fuel cell system according to claim 5, wherein the startup control device is programmed to supply, when restarting the startup operations from the POX operation, a reduced amount of oxidizing gas compared to that normally supplied in the POX operation.

* * * * *